United States Patent
Hindle

[11] 3,897,983
[45] Aug. 5, 1975

[54] AIR BEARING

[75] Inventor: John Anthony Hindle, Leeds, England

[73] Assignee: Joseph Lucas (Industries) Limited, Birmingham, England

[22] Filed: Sept. 26, 1973

[21] Appl. No.: 400,813

[30] Foreign Application Priority Data
Sept. 26, 1972 United Kingdom............... 44306/72

[52] U.S. Cl. .................................................. 308/26
[51] Int. Cl. ........................... F16c 27/06; F16f 1/38
[58] Field of Search ....................................... 308/26

[56] References Cited
UNITED STATES PATENTS

| | | | |
|---|---|---|---|
| 2,352,908 | 7/1944 | Moore | 308/26 |
| 2,390,168 | 12/1945 | Piot | 308/26 |
| 2,642,318 | 6/1953 | Ricks | 308/26 |
| 2,851,314 | 9/1958 | Thomson | 308/26 |
| 3,592,518 | 7/1971 | Pfister et al. | 308/26 |

FOREIGN PATENTS OR APPLICATIONS

| | | | |
|---|---|---|---|
| 1,347,877 | 12/1964 | France | 308/26 |

OTHER PUBLICATIONS

Russian Publication, "Detaili i Mekhanismy Metallorezhushchikh Stankov," (Components and Mechanisms of Cutting Tools), p. 99, Fig. 10, Edited By D. N. Reshetova, Moscow, 1972.

Primary Examiner—Charles J. Myhre
Assistant Examiner—Sheldon Richter
Attorney, Agent, or Firm—Holman & Stern

[57] ABSTRACT

An air bearing has an inner split resilient refractory ring supported within an outer ring by means of an elastomeric ring interposed between the inner and outer rings. The elastomeric ring and the split in the inner ring allow the latter to deform as a result of thermal expansion and as a result of air pressure within the bearing when in use.

6 Claims, 6 Drawing Figures

PATENTED AUG 5 1975

SHEET 2

3,897,983

AIR BEARING

This invention relates to air bearing for shafts.

It is known to provide air bearings which have an inner ring or sleeve of refractory material, a shaft passing through this inner ring being supported and spaced from the ring by compressed air between the ring and the shaft.

It has been found necessary to provide for the differential thermal expansion encountered, in use, between the inner refractory ring and a surrounding supporting structure. It is also necessary to provide for deformation of the refractory ring due to the increase in bearing air pressures encountered at higher shaft speeds.

It is an object of the invention to provide an air bearing in which an inner refractory ring may deform to accommodate the conditions encountered in use.

According to the invention an air bearing comprises an inner split ring of a resilient refractory material, a rigid outer ring and a ring of an elastomeric material located between the inner and outer rings and supporting the inner ring with respect to the outer ring.

Examples of the invention will now be described with reference to the accompanying drawing, in which.

Figure 1:
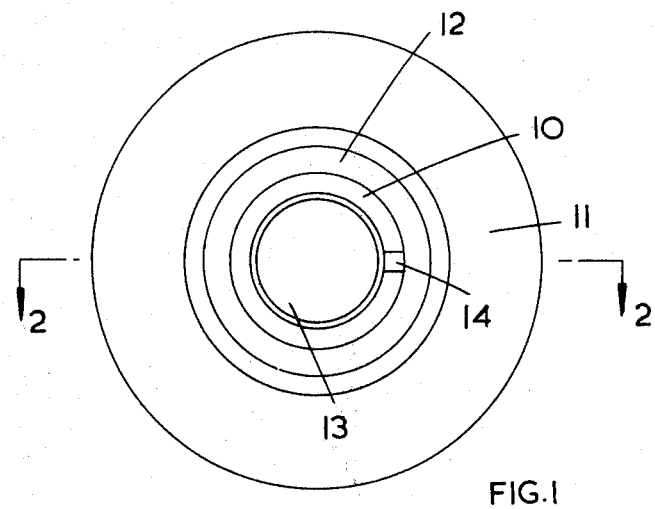
FIG. 1 is an end view of a bearing.
Figure 2:
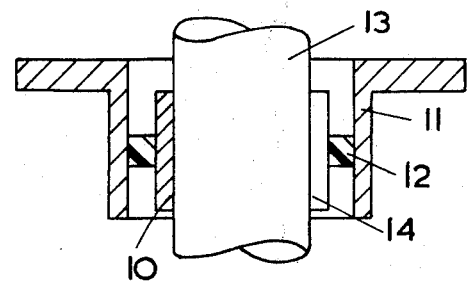
FIG. 2 is a section on line 2—2 in FIG. 1.

The bearing shown in FIGS. 1 and 2 has an inner split ring 10 of carbon and a rigid outer ring 11 of steel. The outer ring 11 may, in use, form part of, or be secured to, a stater of an electric motor having a rotor which includes a shaft 13 which is to be supported by the bearing. The inner ring 10 is dimensioned so as to have a bore diameter approximately 0.05 millimetres larger than the diameter of the shaft which it is to support. This clearance is shown much exaggerated in FIG. 1.

An elastomeric ring 12 is moulded in place between the inner ring 10 and outer ring 11, and supports the inner ring 10 in place. In the present example the ring 12 is formed of natural rubber. The free ends of split ring 10 define a slot 14.

In use, the slot 14 is positioned having regard to the magnitude and direction of any radial load on shaft 13. Assuming that a radial load acts generally downwards, as seen in FIG. 1. Anticlockwise rotation of shaft 13, also as seen in FIG. 1, will cause entrainment of air from the slot 14. This air is carried round the clearance between the shaft 13 and inner ring 10, and has a maximum pressure adjacent the radial plane of the maximum load. The wedging action of the air to support the load has been found to be improved if the inner ring 10 is permitted to deform somewhat as a result of increases in the bearing air pressures as shaft speed increases. This deformation is catered for by the slot 14 and the elastomeric supporting ring 12.

It will be understood that the inner ring need not be formed of carbon, but of some other suitable refractory material, such as silicon nitride.

Figure 3:
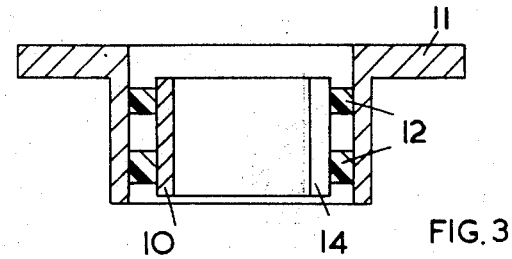
FIGS. 3 and 4 show alternative forms of bearing.
Figure 4:
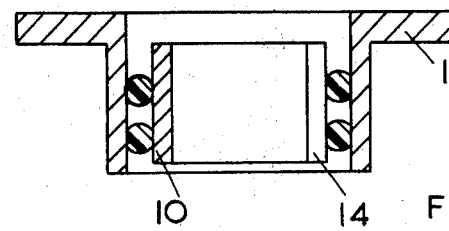

In the alternative arrangement shown in FIG. 3, two axially spaced elastomeric rings 12 are provided. In the further alternative example of FIG. 4 the ring, or rings 12 are replaced by toroidal sealing rings 15 which are not moulded in place but which are compressed to frictionally engage the inner and outer rings 10, 11.

In practice, as for example when forming part of an elastomeric motor as above described, the shaft will normally be supported in a pair of axially aligned bearings.

A high shaft speeds the phenomenon known as "whirling" can occur, in which the shaft axis moves with respect to the bearing axis. As a result of the general resilience of the bearings described above, the whirling effect will be largely unrestrained, and it has been found advisable to damp this resilience in such a way as to reduce whirling, without seriously affecting the freedom of movement of the inner ring in response to thermal expansion and air pressure. The arrangement shown in FIGS. 5 and 6 has been found to have the desired effect.

Figure 5:
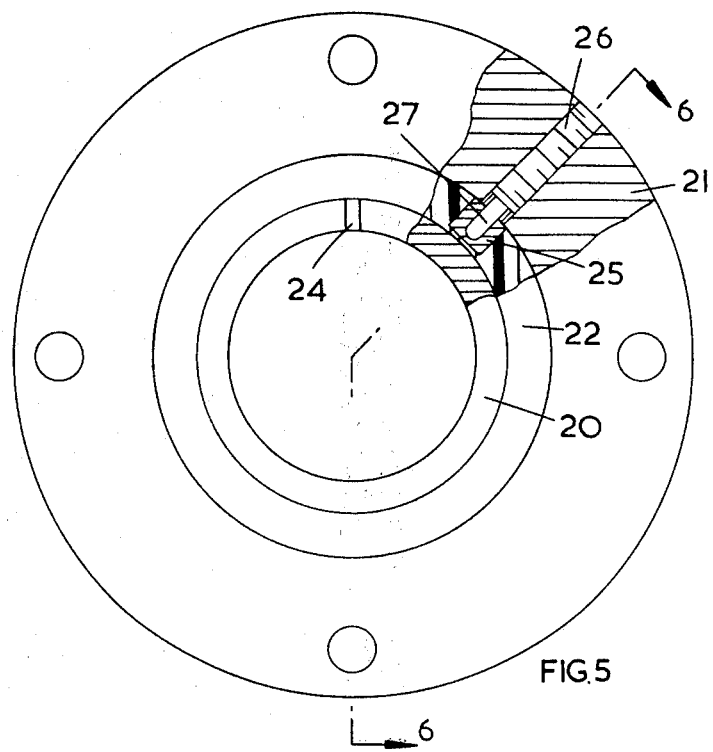
FIG. 5 shows a further alternative form of bearing.
Figure 6:
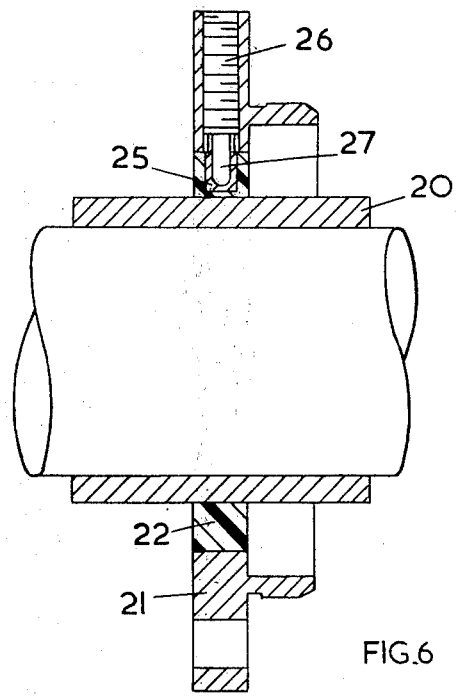
FIG. 6 is a section on line 6—6 in FIG. 5.

The bearing in FIGS. 5 and 6 is generally similar to that of FIGS. 1 and 2, having a split inner refractory ring 20, and outer steel ring 21 and an elastomeric ring 22 moulded in place to support the inner ring 20 with respect to the outer ring 21. Moulded into the elastomeric ring 22 is a metal insert 25. A screw 26 is engaged in a radially-extending threaded hole in ring 21 and has a plain stem end 27 of reduced diameter which is received in an aligned hole in the metal insert 25.

When the screw 26 is tightened down it creates a zone of increased stress in the elastomeric ring 22 adjacent the insert 25. This stress zone reduces the resilience of the ring 22. As shown in FIG. 5 the arrangement is intended for a shaft rotating anti-clockwise. It has been found that the insert 25 and screw 26 are most effective to reduce whirling when positioned in the fourth quadrant, in the direction of rotation of the shaft, from the gap 24 in the split ring 20.

I claim:

1. An air bearing, comprising an inner split ring of a resilient refractory material, a rigid outer ring, a ring of an elastomeric material located between the inner and outer rings and supporting the inner ring with respect to the outer ring, and means for varying the resilience of said elastomeric ring.

2. An air bearing as claimed in claim 1 which includes a plurality of axially-spaced elastomeric rings.

3. An air bearing as claimed in claim 1 in which said elastomeric ring frictionally engages said inner and outer rings.

4. An air bearing as claimed in claim 3 in which said elastomeric ring is toroidal in form.

5. An air bearing as claimed in claim 1 in which said resilience-varying means comprises a stem mounted in said outer ring and movable radially inwardly thereof to coact with an adjacent portion of said elastomeric ring.

6. An air bearing as claimed in claim 5 in which said resilience-varying means is positioned to coact with a zone of said elastomeric ring which lies in a fourth quadrant, in the direction of rotation of a shaft within the bearing, from a slot defined by the free ends of the split ring.

* * * * *